United States Patent
Schmidt et al.

(10) Patent No.: US 8,889,578 B2
(45) Date of Patent: Nov. 18, 2014

(54) PROCESSES FOR REGENERATING SULFUR-POISONED, RUTHENIUM AND/OR RUTHENIUM COMPOUND-CONTAINING CATALYSTS

(75) Inventors: Timm Schmidt, Kaarst (DE); Tim Loddenkemper, Dormagen (DE); Frank Gerhartz, Leverkusen (DE); Walther Müller, Pulheim (DE)

(73) Assignee: Bayer MaterialScience AG, Leverkusen (DE)

( * ) Notice: Subject to any disclaimer, the term of this patent is extended or adjusted under 35 U.S.C. 154(b) by 69 days.

(21) Appl. No.: 12/408,803

(22) Filed: Mar. 23, 2009

(65) Prior Publication Data

US 2009/0239736 A1    Sep. 24, 2009

(30) Foreign Application Priority Data

Mar. 22, 2008   (DE) .......................... 10 2008 015 406

(51) Int. Cl.
| | |
|---|---|
| *B01J 38/44* | (2006.01) |
| *C01B 7/04* | (2006.01) |
| *B01J 23/96* | (2006.01) |
| *B01J 38/42* | (2006.01) |
| *B01J 21/06* | (2006.01) |
| *B01J 37/02* | (2006.01) |
| *B01J 37/16* | (2006.01) |
| *B01J 23/62* | (2006.01) |
| *B01J 23/46* | (2006.01) |

(52) U.S. Cl.
CPC ................ *B01J 23/96* (2013.01); *B01J 21/063* (2013.01); *C01B 7/04* (2013.01); *B01J 37/0201* (2013.01); *B01J 37/16* (2013.01); *B01J 38/42* (2013.01); *B01J 21/06* (2013.01); *B01J 23/626* (2013.01); *B01J 23/462* (2013.01)
USPC .......................................................... 502/37

(58) Field of Classification Search
None
See application file for complete search history.

(56) References Cited

U.S. PATENT DOCUMENTS

| | | | | | |
|---|---|---|---|---|---|
| 2,454,227 | A | * | 11/1948 | Beeck et al. .................. | 502/344 |
| 3,980,589 | A | * | 9/1976 | Murrell et al. ................ | 502/328 |
| 4,072,628 | A | | 2/1978 | Kruse et al. | |
| 4,851,380 | A | * | 7/1989 | Van Leirsburg et al. ........ | 502/37 |
| 5,260,238 | A | | 11/1993 | Murakawa et al. | |
| 5,308,456 | A | * | 5/1994 | Kunz et al. ...................... | 429/16 |
| 6,566,539 | B1 | * | 5/2003 | Campos et al. ............... | 549/326 |
| 6,908,873 | B2 | * | 6/2005 | Zhou et al. ...................... | 502/29 |
| 7,247,592 | B2 | | 7/2007 | Echido et al. | |
| 7,318,915 | B2 | | 1/2008 | Jordan et al. | |
| 2007/0292336 | A1 | | 12/2007 | Wolf et al. | |

FOREIGN PATENT DOCUMENTS

| | | |
|---|---|---|
| DE | 1567788 C | 5/1970 |
| DE | 102006024543 A1 | 11/2007 |
| EP | 0535619 A1 | 4/1993 |
| EP | 0743277 A1 | 11/1996 |
| EP | 1867631 A1 | 12/2007 |
| EP | 1961699 A1 | 8/2008 |
| GB | 744049 A | 2/1956 |
| GB | 1046313 A | 10/1966 |
| GB | 1278119 A | 6/1972 |
| WO | WO-2007/066810 A1 | 6/2007 |
| WO | WO-2007/134721 A2 | 11/2007 |

* cited by examiner

*Primary Examiner* — Melvin C Mayes
*Assistant Examiner* — Stefanie Cohen
(74) *Attorney, Agent, or Firm* — Drinker Biddle & Reath LLP

(57) ABSTRACT

Processes comprising: providing a catalyst comprising a catalytic component selected from the group consisting of ruthenium, ruthenium compounds, and combinations thereof, wherein the catalyst is sulfur-poisoned with one or more sulfur compounds; and treating the catalyst with a gas stream comprising a hydrogen halide under nonoxidative conditions such that the catalyst is regenerated.

20 Claims, No Drawings

PROCESSES FOR REGENERATING SULFUR-POISONED, RUTHENIUM AND/OR RUTHENIUM COMPOUND-CONTAINING CATALYSTS

BACKGROUND OF THE INVENTION

In the case of catalysts containing ruthenium or ruthenium compounds, the reaction with sulfur compounds leads in many typical applications to an irreversible reduction of the activity, which is attributable in conventional opinion to poisoning.

A typical field of use for a catalyst containing ruthenium or ruthenium compounds is the preparation of chlorine by gas-phase oxidation of hydrogen chloride with oxygen:

$$4HCl + O_2 \rightleftharpoons 2Cl_2 + 2H_2O$$

This reaction is an equilibrium reaction. The position of the equilibrium shifts to the detriment of the desired end product with increasing temperature. It is therefore advantageous to use catalysts which have the highest possible activity and enable the reaction to take place at a lower temperature.

The first catalysts for the hydrogen chloride oxidation contained copper chloride or copper oxide as an active component and were described by Deacon as long ago as 1868. However, these had only low activities at low temperature (<400° C.). Although it was possible to increase the activity thereof by increasing the reaction temperature, a disadvantage was that the volatility of the active components led to rapid deactivation.

Since it was not possible to make substantial progress up to the 1960s in spite of immense research activities in this area, the Deacon process named after the discoverer was eclipsed by the chloralkali electrolysis. Up to the 90s, virtually the total production of chlorine was effected by electrolysis of aqueous sodium chloride solutions [Ullmann's Encyclopedia of Industrial Chemistry, seventh release, 2006]. However, since the worldwide demand for chlorine is currently growing more strongly than the demand for sodium hydroxide, the attractiveness of the Deacon process is unbroken since hydrogen chloride can be reused thereby for the preparation of chlorine, which results in large amounts thereof as a coproduct, for example in the phosgenation of amines.

Substantial progress in the area of hydrogen chloride oxidation was made by the discovery of ruthenium or ruthenium compounds as catalytically active components, which were described for the first time in 1965 in DE 1567788. Particularly in the provision of a suitable support, considerable progress has since been made. Titanium dioxide, the use of which is described, for example, in the application EP 743277 A1, and tin dioxide, the use of which is evident, for example, from the application DE 10 2006 024 543 A1, appear particularly suitable as supports.

Further typical fields of use for catalysts containing ruthenium or ruthenium compounds are the (selective) oxidation of carbon monoxide and the purification of exit air. U.S. Pat. No. 7,247,592 B2 describes a catalyst containing ruthenium or ruthenium compounds for the selective oxidation of carbon monoxide. U.S. Pat. No. 7,318,915 B2 discloses the use of catalysts containing ruthenium or ruthenium compounds for combined use in the area of exit air treatment. There, the catalyst described oxidizes carbon monoxide and volatile hydrocarbons, while nitrous gases are also reduced.

A multiplicity of further uses for catalysts containing ruthenium or ruthenium compounds is also known. Particularly in the synthesis of key organic chemicals from mineral oil fractions, natural gas or coal, catalysts containing ruthenium or ruthenium compounds often play a key role.

A major problem with the use of catalysts containing ruthenium or ruthenium compounds is evidently the sensitivity thereof to poisoning with sulfur. A sulfur load in the entry stream may be characterized, for example, by sulfur-containing raw materials (e.g. mineral oil fractions, natural gas, coal) or upstream processes (e.g. gas drying with sulfuric acid, sulfur-containing active carbon). WO 2007 066 810 A1 discloses, for example, that it is of decisive importance for the life of a catalyst containing ruthenium or ruthenium compounds for the oxidation of hydrogen chloride to reduce the sulfur load in the entry stream to below 2 ppm. For reducing the sulfur load, various oxides on which sulfur components are deposited by reaction are described in this application. A disadvantage of this process is that volatile chlorides of these elements may be entrained onto the catalyst or a peak contamination in the sulfur load may lead to a breakthrough of sulfur compounds.

Processes for the regeneration of catalysts containing ruthenium or ruthenium compounds and poisoned with sulfur in the form of sulfur compounds have already been described but have all kinds of disadvantages. GB 744 049 A discloses that catalysts containing ruthenium or ruthenium compounds and poisoned with sulfur in the form of sulfur compounds can be regenerated by scrubbing. Water, ethanol, acetic acid, cyclohexene, benzene and acetone are mentioned as examples of the wash liquid. However, scrubbing always entails the risk that a part of the active components will be discharged with the wash liquid. This can happen both through physicochemical processes (e.g. reaction+absorption, solubility) and through mechanical processes (e.g. abrasion). Furthermore, for scrubbing, the catalyst must as a rule be removed from the reactor used for the target reaction.

GB 1 278 119 A describes the regeneration of a catalyst containing ruthenium or ruthenium compounds and poisoned with sulfur in the form of sulfur compounds by a reducing treatment with an anhydrous hydrogen stream at 430 to 595° C., a pressure between 3 and 24 bar and some further oxidation and reduction steps. Such a combination of reducing conditions and high temperatures will lead to substantial reduction of ruthenium oxides (if present beforehand) to metallic ruthenium down to relatively deep layers. As a result of this treatment, the catalyst containing ruthenium or ruthenium compounds will be subjected to drastic changes which are probably undesired for some applications. Moreover, pressure-resistant reactors, pipelines and fittings must be available for this application, and for this reason the catalyst would as a rule have to be removed for this treatment.

Accordingly, no process which is simple to handle has as yet been developed, by means of which the regeneration of a catalyst containing ruthenium or ruthenium compounds and poisoned with sulfur in the form of sulfur compounds is possible under mild conditions. The processes known to date all entail the risk of a partial loss of ruthenium or an undesired change in the catalyst structure. Accordingly, gradual poisoning of a catalyst containing ruthenium or ruthenium compounds by sulfur in the form of sulfur compounds is still a limiting factor for the on-stream time in many processes. An abrupt, irreversible loss of activity due to an undesired peak in the sulfur load (e.g. owing to non-steady-state startup processes) represents the worst case scenario. Both factors entail an enormous economic risk since the recovery of the ruthenium from a spent catalyst is expensive and a partial ruthenium loss must be allowed for.

BRIEF SUMMARY OF THE INVENTION

The present invention relates, in general, to processes by which sulfur content of a catalyst containing ruthenium or ruthenium compounds and poisoned with sulfur in the form of sulfur compounds can be reduced by a targeted treatment with a hydrogen chloride-containing stream under nonoxidative conditions to such an extent that the activity thereof increases to the activity of a catalyst of the same type which is not poisoned with sulfur in the form of sulfur compounds. The success of this regeneration is demonstrated by way of example by the catalytic oxidation of hydrogen chloride with oxygen and by the oxidation of carbon monoxide with oxygen.

The various embodiments of the present invention can provide an effective, gentle and simple process for the regeneration of a catalyst containing ruthenium or ruthenium compounds and poisoned with sulfur in the form of sulfur compounds.

Surprisingly, it was found that the sulfur content of a catalyst containing ruthenium or ruthenium compounds and poisoned with sulfur in the form of sulfur compounds can be reduced by a targeted treatment with a gas stream containing hydrogen halide, in particular hydrogen chloride, under nonoxidative conditions and optionally elevated temperature to such an extent that the activity thereof increases to the activity of a catalyst of the same type which was not poisoned with sulfur in the form of sulfur compounds.

The invention relates to a process for regenerating a catalyst containing ruthenium or ruthenium compounds and poisoned with sulfur in the form of sulfur compounds, characterized in that the catalyst is subjected, optionally at elevated temperature, to a treatment with a gas stream containing hydrogen halide, in particular hydrogen chloride, under nonoxidative conditions.

One embodiment of the present invention includes processes comprising: providing a catalyst comprising a catalytic component selected from the group consisting of ruthenium, ruthenium compounds, and combinations thereof wherein the catalyst is sulfur-poisoned with one or more sulfur compounds; and treating the catalyst with a gas stream comprising a hydrogen halide under nonoxidative conditions such that the catalyst is regenerated.

Another embodiment of the present invention includes processes comprising: providing hydrogen chloride; oxidizing the hydrogen chloride in the gas phase with oxygen in the presence of a catalyst comprising a catalytic component selected from the group consisting of ruthenium, ruthenium compounds, and combinations thereof; and subjecting the catalyst to a regeneration process according to other various embodiments of the present invention.

As used herein, the expression "regeneration of a catalyst containing ruthenium or ruthenium compounds and poisoned with sulfur" is also described in shortened form as catalyst regeneration or regeneration or with similar expressions. The various process embodiments according to the invention can be used in the regeneration of catalysts based both on ruthenium metal and on ruthenium compounds.

Preferred ruthenium compounds are ruthenium halides, in particular ruthenium chlorides, ruthenium oxyhalides, in particular ruthenium oxychlorides, or ruthenium oxides, which may be present individually or as a mixture. Here, for the regeneration of the chlorine-containing ruthenium compounds, hydrogen chloride is preferably used for the regeneration.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a catalyst" herein or in the appended claims can refer to a single catalyst or more than one catalyst. Additionally, all numerical values, unless otherwise specifically noted, are understood to be modified by the word "about."

In the context of the invention, a catalyst is considered to be poisoned in particular when its activity, measured on the basis of the conversion of the catalyst containing ruthenium or ruthenium compounds and poisoned with sulfur in the form of sulfur compounds (operating catalyst) in the differential conversion range of the catalysed reaction (conversion $<=10\%$), has fallen in particular by at least 5%, preferably by at least 10%, particularly preferably by at least 20%. In various preferred embodiments, for determining the loss of activity, a small side-stream is separated off from the main stream to be fed in and is passed over a separate catalyst bed comprising the same catalyst material, in which a differential conversion is achieved by a suitable choice of the contact time. In various preferred embodiments, a small part of the catalyst which is used and contains ruthenium or ruthenium compounds (operating catalyst) is removed from the reactor and transferred to a separate catalyst bed and the loss of activity is determined in the differential conversion range by means of a model reaction by a suitable choice of the contact time.

Sulfur compounds which can poison (deactivate) catalysts containing ruthenium or ruthenium compounds are preferably one or more compounds selected from the series: $H_2SO_4$, $H_2SO_3$, $SO_3$, $SO_2$, COS, $H_2S$ and salts of $H_2SO_4$ and $H_2SO_3$. As a result of the reaction with the catalyst surface, these sulfur compounds are converted under oxidative conditions preferably into oxides of sulfur which are incorporated into the catalyst surface, preferably via bridging oxygen or sulfur-metal bonds. Under reducing conditions, the sulfur is incorporated into the catalyst surface preferably via sulfur-metal bonds. As a result of the processes according to the invention, the sulfur immobilized by the reaction at the catalyst surface in the form of sulfur compounds can be converted back into volatile sulfur compounds which can be removed from the catalyst surface.

The regeneration is carried out in particular at a temperature up to 600° C. In various preferred embodiments, the regeneration is carried out at a temperature of 200° C. to 500° C., in particularly preferred embodiments at a temperature of 300° C. to 450° C.

The regeneration stream contains hydrogen halide, preferably hydrogen chloride, the hydrogen halide content preferably being 0.1 to 100% by volume. In various preferred embodiments, the hydrogen halide content of the regeneration stream is 1 to 30% by volume, particularly preferably 5 to 25% by volume. Further constituents of the regeneration stream may be in particular inert gases, such as, for example, nitrogen or argon. The individual hydrogen halide can also be replaced by substances or mixtures of substances which liberate hydrogen halide, i.e. in particular hydrogen chloride, fluoride, bromide or iodide, under the regeneration conditions described, or substances or mixtures of substances whose hydrogen and halogen functions achieve an effect comparable with an individual hydrogen halide under the regeneration conditions described. Phosgene is mentioned here by way of example.

The regeneration stream contains only a small proportion of oxygen, i.e. in particular not more than 1% by volume, preferably not more than 0.2% by volume, particularly preferably not more than 0.1% by volume, of oxygen. In particularly preferred embodiments, the regeneration stream contains no oxygen.

According to the invention, the gases which are mentioned and can be used for the regeneration often contain, for technical reasons, impurities (of the order of magnitude of <1000 ppm), e.g. chlorine and water, the presence of which is not disadvantageous for the regeneration. Troublesome impurities (e.g. sulfur in the form of sulfur compounds or oxygen) are expediently to be removed from the regeneration gas beforehand.

The duration of regeneration is preferably 0.5 hour to 100 hours. With an unnecessarily long duration of regeneration, the ruthenium content of the catalyst may be reduced to an undesired extent by the formation of volatile ruthenium compounds. The optimum duration of regeneration depends in particular on the sulfur load, on the regeneration temperature and on the content of hydrogen chloride in the regeneration stream. The regeneration can be effected either in one step or in a plurality of intervals. The regeneration is preferably effected at intervals, the sulfur content and/or the activity of the catalyst being determined between the time intervals.

In particularly preferred embodiments, the catalyst remains during the regeneration in the reactor in which the catalytic target reaction is also carried out. In various preferred embodiments of this process, the regeneration can be carried out countercurrently to the normal direction of flow in order to avoid entrainment of discharged sulfur components onto slightly poisoned or unpoisoned catalyst layers.

A preferred application is the regeneration of catalysts containing ruthenium or ruthenium compounds and intended for the catalysed gas-phase oxidation of hydrogen chloride with oxygen, since the required environment in terms of apparatus for handling hydrogen chloride is already present here and the catalyst must withstand a hydrogen chloride atmosphere even during the reaction.

A preferred application is the regeneration of catalysts whose active component mainly comprises supported ruthenium or ruthenium compounds. A particularly preferred application is the regeneration of catalysts which contain ruthenium or ruthenium compounds and whose support mainly has a rutile structure. A further particularly preferred embodiment is the regeneration of catalysts which contain ruthenium or ruthenium compounds and whose support contains titanium dioxide, alumina, zirconium oxide or tin dioxide or mixtures thereof. A preferred application is the catalyst regeneration in connection with a process consisting of a plurality of coupled steps and intended for isocyanate preparation, including catalysed hydrogen chloride oxidation, the individual process steps of which are disclosed in principle, for example, in EP 1867631 A1, the entire contents of which are hereby incorporated herein by reference.

The novel process is preferably combined with the catalytic gas-phase oxidation process known as the Deacon process. Here, hydrogen chloride is oxidized with oxygen in an exothermic equilibrium reaction to give chlorine, steam being obtained. The reaction temperature is usually 150 to 500° C. and the reaction pressure is usually 1 to 25 bar. Since it is an equilibrium reaction, it is expedient to work at temperatures which are as low as possible and at which the catalyst still has sufficient activity. Furthermore, it is expedient to use oxygen in superstoichiometric amounts relative to the hydrogen chloride. For example, a two-fold to four-fold excess of oxygen is usual. Since no selectivity losses are to be feared, it may be economically advantageous to work at relatively high pressure and accordingly with a residence time which is longer compared with atmospheric pressure.

The catalytic hydrogen chloride oxidation can be carried out adiabatically or preferably isothermally or approximately isothermally, batchwise, but preferably continuously, as a fluid-bed or fixed-bed process, preferably as a fixed-bed process, particularly preferably in tube-bundle reactors over heterogeneous catalysts at a reaction temperature of 180 to 500° C., preferably 200 to 400° C., particularly preferably 220 to 350° C., and a pressure of 1 to 25 bar (1000 to 25 000 hPa), preferably 1.2 to 20 bar, particularly preferably 1.5 to 17 bar and in particular 2.0 to 15 bar.

Customary reaction apparatuses in which the catalytic hydrogen chloride oxidation is carried out are fixed-bed or fluidized-bed reactors. The catalytic hydrogen chloride oxidation can preferably also be carried out in a plurality of stages.

The conversion of hydrogen chloride in a single pass can preferably be limited to 15 to 90%, preferably 40 to 90%, particularly preferably 50 to 90%. Unconverted hydrogen chloride can be recycled partly or completely to the catalytic hydrogen chloride oxidation after being separated off.

In the case of the adiabatic or approximately adiabatic procedure, it is also possible to use a plurality of reactors connected in series, i.e. 2 to 10, preferably 2 to 6, particularly preferably 2 to 5, in particular 2 or 3, of said reactors, with additional intermediate cooling. The hydrogen chloride can be added either completely together with the oxygen for the first reactor or distributed over the various reactors. This series connection of individual reactors can also be combined in one apparatus. In this case, a preferred purification process for the catalyst can be particularly easily realised as an in situ process by removing one reactor of the reactor cascade from the Deacon process and subjecting the catalyst present therein to the regeneration according to the invention.

A further preferred embodiment of an apparatus suitable for the Deacon process consists in using a structured catalyst bed in which the catalyst activity increases in the direction of flow. Such structuring of the catalyst bed can be effected by varying impregnation of the catalyst supports with active material or by varying dilution of the catalyst with an inert material. For example, rings, cylinders or spheres of titanium dioxide, zirconium dioxide or mixtures thereof, alumina, steatite, ceramic, glass, graphite or stainless steel can be used as inert material. In the preferred use of catalyst mouldings, the inert material should preferably have similar external dimensions.

Suitable preferred catalysts for the Deacon process contain ruthenium oxides, ruthenium chlorides or other ruthenium compounds. Suitable support materials are, for example, silica, graphite, titanium dioxide having a rutile or anatase structure, zirconium dioxide, alumina or mixtures thereof, preferably titanium dioxide, zirconium dioxide, alumina or mixtures thereof, particularly preferably γ- or δ-alumina or mixtures thereof. Suitable catalysts can be obtained, for example, by application of ruthenium (III) chloride to the support and subsequent drying or drying and calcination. Suitable catalysts may contain, in addition to a ruthenium compound, also compounds of other noble metals, for example gold, palladium, platinum, osmium, iridium, silver, copper or rhenium. Suitable catalysts may furthermore contain chromium (III) oxide.

Alkali metals, such as lithium, sodium, potassium, rubidium and caesium, preferably lithium, sodium and potassium, particularly preferably potassium, alkaline earth metals, such as magnesium, calcium, strontium and barium, preferably magnesium and calcium, particularly preferably magnesium, rare earth metals, such as scandium, yttrium, lanthanum, cerium, praseodymium and neodymium, preferably scandium, yttrium, lanthanum and cerium, particularly preferably lanthanum and cerium, or mixtures thereof are suitable as promoters for doping the catalysts.

The shaping of the catalyst can be effected after or preferably before the impregnation of the support material. Suitable catalyst mouldings are mouldings having any desired shapes, tablets, rings, cylinders, stars, wagon wheels or spheres are preferred and rings, cylinders or star extrudates are particularly preferred as the shape. The mouldings can then be dried at temperatures of 100 to 400° C., preferably 100 to 300° C., for example under a nitrogen, argon or air atmosphere, and optionally calcined. The mouldings are preferably first dried at 100 to 150° C. and then calcined at 200 to 400° C.

A further possible application is the regeneration of a catalyst which is present in a sacrificial bed upstream of the actual catalyst for the main reaction, in particular a Deacon reaction, and protects this in particular from sulfur compounds but also from other catalyst poisons.

The invention will now be described in further detail with reference to the following non-limiting examples.

EXAMPLES

Part 1

Preparation of the Catalysts

In order to be able to illustrate the invention, pelletized ruthenium catalysts supported on $SnO_2$ or $TiO_2$ were prepared.

Example 1a 200 g of $SnO_2$ pellets (spherical, diameter about 1.9 mm, Alfa Aesar) were impregnated with a solution of 9.99 g of ruthenium chloride n-hydrate in 33.96 ml of $H_2O$ and then thoroughly mixed for 1 h. The moist solid was then dried at 60° C. in a muffle furnace (air) for 4 h and thereafter calcined for 16 h at 250° C.

Example 1b 100 g of $TiO_2$ pellets (cylindrical, diameter about 2 mm, length 2 to 10 mm, Saint-Gobain) were impregnated with a solution of ruthenium chloride n-hydrate in $H_2O$ so that the Ru content was 3% by weight. The moist pellets thus obtained were dried overnight at 60° C. and introduced in the dry state, while flushing with nitrogen, into a solution of NaOH and 25% hydrazine hydrate solution in water and left to stand for 1 h. Excess water was then evaporated off. The moist pellets were dried for 2 h at 60° C. and then washed with 4×300 g of water. The moist pellets thus obtained were dried in a muffle furnace (air) for 20 min at 120° C. and thereafter calcined for 3 h at 350° C.

Part 2

Poisoning of the Catalysts With Sulfur Compounds

In order to be able to illustrate the invention, a part of the prepared catalyst pellets was deliberately poisoned with sulfur in the form of the sulfur compounds COS and $SO_2$. The designation of the catalysts after the poisoning and the most important features of the poisoning runs are also shown in Tab. 2.

Example 2a 5 g of the catalyst pellets prepared according to Example 1a were initially introduced into a quartz reaction tube (diameter 10 mm) and a gas mixture comprising 5 l/h of hydrogen chloride 20 l/h of oxygen, 25 l/h of nitrogen and 0.05 l/h of COS flowed through said catalyst pellets at 330° C. for one hour.

Example 2b 5 g of the catalyst pellets prepared according to Example 1a were initially introduced into a quartz reaction tube (diameter 10 mm) and a gas mixture comprising 5 l/h of hydrogen chloride, 20 l/h of oxygen, 25 l/h of nitrogen and 0.05 l/h of $SO_2$ flowed through said catalyst pellets at 330° C. for one hour.

Example 2c 5 g of the catalyst pellets prepared according to Example 1b were initially introduced into a quartz reaction tube (diameter 10 mm) and a gas mixture comprising 5 l/h of hydrogen chloride, 20 l/h of oxygen, 25 l/h of nitrogen and 0.05 l/h of COS flowed through said catalyst pellets at 330° C. for one hour.

Example 2d 5 g of the catalyst pellets prepared according to Example 1b were initially introduced into a quartz reaction tube (diameter 10 mm) and a gas mixture comprising 5 l/h of hydrogen chloride, 20 l/h of oxygen, 25 l/h of nitrogen and 0.05 l/h of $SO_2$ flowed through said catalyst pellets at 330° C. for one hour.

TABLE 1

Designation of the catalysts poisoned with sulfur and the most important features of the poisoning runs.

| Designation of the catalyst pellets | | Poisoning conditions | | |
|---|---|---|---|---|
| after poisoning | before poisoning | Component | Duration [h] | Gas flow [l/h] |
| 2a | 1a | COS | 1 | 0.05 |
| 2b | 1a | $SO_2$ | 1 | 0.05 |
| 2c | 1b | COS | 1 | 0.05 |
| 2d | 1b | $SO_2$ | 1 | 0.05 |

Example 3

Intermittent regeneration of the supported ruthenium catalysts ($SnO_2$ support) poisoned with sulfur in the form of the sulfur compounds COS and $SO_2$ The regeneration was carried out intermittently, the regeneration intervals being characterized by i to v and the process steps being described below.

In each case 1 g of the catalyst pellets having the designations 1a, 2a and 2b were initially introduced into three quartz reaction tubes (diameter 10 mm) and in each case a gas mixture 1 (10 l/h) composed of 1 l/h of hydrogen chloride, 4 l/h of oxygen and 5 l/h of nitrogen flowed through said catalyst pellets for 16 h and thereafter a gas mixture 2 (6 l/h) composed of 1 l/h of hydrogen chloride and 5 l/h of nitrogen flowed through said catalyst pellets intermittently for regeneration. After each regeneration interval, the system was changed back to gas mixture 1 (10 l/h) and, after a running time of about 1 h, the product gas stream of all reactors was passed twice for about 15 min through a 20% strength potassium iodide solution in order to check the success of the regeneration. The iodide formed was then titrated with 0.1 N thiosulphate standard solution (double determination) in order to determine the amount of chlorine passed in. From the amount of chlorine determined in this manner, the space-time yield (STY) was determined according to the following formula (Tab. 3a):

$$STY = g(chlorine) \cdot g^{-1}(catalyst) \cdot h^{-1}(time).$$

Interval i: Gas mixture 2 (regeneration) flowed through the catalyst pellets for 1 h at 330° C., followed by gas mixture 1 (checking for success) for 2 h at 330° C.

Interval ii: Gas mixture 2 (regeneration) flowed through the catalyst pellets for 1 h at 330° C., followed by gas mixture 1 (checking for success) for 2 h at 330° C.

Interval iii: Gas mixture 2 (regeneration) flowed through the catalyst pellets for 14 h at 330° C., followed by gas mixture 1 (checking for success) for 2 h at 330° C.

Interval iv: Gas mixture 2 (regeneration) flowed through the catalyst pellets for 4 h at 380° C., followed by gas mixture 1 (checking for success) for 3 h at 330° C.

Interval v: Gas mixture 2 (regeneration) flowed through the catalyst pellets for 14 h at 380° C., followed by gas mixture 1 (checking for success) for 3 h at 330° C.

After this regeneration, the catalyst pellets were removed and ground in a mortar and ruthenium content and sulfur content were determined by means of RFA (Tab. 3b). The procedure was also effected by the same method with a corresponding proportion of the unregenerated catalyst pellets.

TABLE 3a

STY of the catalysts (before and) after the individual regeneration intervals.

| Interval | STY of 2a [g/gh] | STY of 2b [g/gh] | STY of 1a [g/gh] |
|---|---|---|---|
| before i | 0.39 | 0.35 | 0.61 |
| after i. | 0.43 | 0.385 | 0.61 |
| after ii. | 0.435 | 0.4 | 0.605 |
| after iii. | 0.535 | 0.495 | 0.62 |
| after iv. | 0.62 | 0.565 | 0.635 |
| after v. | 0.655 | 0.605 | 0.625 |

TABLE 3b

Sulfur content and ruthenium content of the catalysts (before and) after the regeneration (determined by means of RFA).

| | Sulfur [%] | | Ruthenium [%] | |
|---|---|---|---|---|
| | after v | before i | after v | before i |
| 1a | 0 | 0 | 2.7 | 2.7 |
| 2a | 0.16 | 0.51 | 2.6 | 2.7 |
| 2b | 0.17 | 0.62 | 2.6 | 2.7 |

The STY of the catalysts (2a, 2b) poisoned with sulfur increased after each regeneration interval and, after the last regeneration interval, was at the same level as that of the unpoisoned reference catalyst (1a). Evidently, the STY loss characterized by the poisoning with sulfur in the form of sulfur compounds was completely compensated again by the sum of all regeneration intervals. The regeneration was successful both in the case of the supported ruthenium catalyst poisoned with COS and in the case of that poisoned with $SO_2$. The STY gain evidently correlates in both cases with a substantial decrease in the sulfur content. A significant ruthenium loss was not found.

Example 4

Intermittent regeneration of supported ruthenium catalysts ($TiO_2$ support) poisoned with sulfur in the form of the sulfur compounds COS and $SO_2$ The regeneration was carried out intermittently, the regeneration intervals being characterized by i to iii and the process steps being described below.

In each case 1 g of the catalyst pellets having the designations 1b, 2c and 2d were initially introduced into three quartz reaction tubes (diameter 10 mm) and in each case a gas mixture 1 (10 l/h) composed of 1 l/h of hydrogen chloride, 4 l/h of oxygen and 5 l/h of nitrogen flowed through said catalyst pellets for 16 h and thereafter a gas mixture 2 (6 l/h) composed of 1 l/h of hydrogen chloride and 5 l/h of nitrogen flowed through said catalyst pellets intermittently for regeneration. After each regeneration interval, the system was changed back to gas mixture 1 (10 l/h) and, after a running time of about 1 h, the product gas stream of all reactors was passed twice for about 15 min through a 20% strength potassium iodide solution in order to check the success of the regeneration. The iodide formed was then titrated with 0.1 N thiosulphate standard solution (double determination) in order to determine the amount of chlorine passed in. From the amount of chlorine determined in this manner, the space-time yield (STY) was determined according to the following formula (Tab. 4a):

$$STY = g(chlorine) \cdot g^{-1}(catalyst) \cdot h^{-1}(time).$$

Interval i: Gas mixture 2 (regeneration) flowed through the catalyst pellets for 0.5 h at 380° C., followed by gas mixture 1 (checking for success) for 2 h at 330° C.

Interval ii: Gas mixture 2 (regeneration) flowed through the catalyst pellets for 2 h at 380° C., followed by gas mixture 1 (checking for success) for 2 h at 330° C.

Interval iii: Gas mixture 2 (regeneration) flowed through the catalyst pellets for 14 h at 380° C., followed by gas mixture 1 (checking for success) for 3 h at 330° C.

After this regeneration, the catalyst pellets were removed and ground in a mortar and ruthenium content and sulfur content were determined by means of RFA (Tab. 4b). The procedure was also effected by the same method with a corresponding proportion of the unregenerated catalyst pellets.

TABLE 4a

STY of the catalysts (before and) after the individual regeneration intervals.

| Interval | STY of 2c [g/gh] | STY of 2d [g/gh] | STY of 1b [g/gh] |
|---|---|---|---|
| before | 0.21 | 0.215 | 0.665 |
| i. | 0.33 | 0.31 | 0.68 |
| ii. | 0.53 | 0.55 | 0.68 |
| iii. | 0.645 | 0.695 | n.d. |

TABLE 4b

Sulfur content and ruthenium content of the catalysts (before and) after the regeneration (determined by means of RFA).

| | Sulfur [%] | | Ruthenium [%] | |
|---|---|---|---|---|
| | after | before | after | before |
| 2c | 0.03 | 0.20 | ~3 | ~3 |
| 2d | 0.03 | 0.26 | ~3 | ~3 |
| 1b | 0 | 0 | ~3 | ~3 |

The STY of the catalysts (2c 2d) poisoned with sulfur increased after each 5 regeneration interval and, after the last regeneration interval, was at the same level as that of the unpoisoned reference catalyst (1b). Evidently, the STY loss characterized by the poisoning with sulfur in the form of sulfur compounds was completely compensated again by the sum of all regeneration intervals. The regeneration was successful both in the case of the supported ruthenium catalyst poisoned with COS and in the case of that poisoned with $SO_2$. The use of another support ($TiO_2$ instead of $SnO_2$) evidently has no adverse effect on the successful regeneration. The STY gain evidently correlates with a substantial decrease in the sulfur content. A significant ruthenium loss was not found.

Example 5

One-stage regeneration of supported ruthenium catalysts ($SnO_2$ support) poisoned with sulfur in the form of the sulfur compound $SO_2$ Catalyst pellets (1 g and 0.42 g, respectively) having designations 1a and 2b were initially introduced into quartz reaction tubes (diameter 10 mm) and in each case a gas mixture 1 (10 l/h) composed of 1 l/h of hydrogen chloride, 4 l/h of oxygen and 5 l/h of nitrogen flowed through said catalyst pellets and thereafter a gas mixture 2 (6 l/h) composed of 1 l/h of hydrogen chloride and 5 l/h of nitrogen flowed through said catalyst pellets for regeneration for 16 h and 63 h, respectively, at 330° C. and 380° C., respectively. After this regeneration, the system was changed back to gas mixture 1 (10 l/h). Before and after this regeneration, the product gas stream of all reactors was passed twice for about 15 min through a 20% strength potassium iodide solution in order to check the success of the regeneration. The iodine formed was then titrated with 0.1 N thiosulphate standard solution (double determination) in order to determine the amount of chlorine passed in. From the amount of chlorine determined in this manner, the space-time yield (STY) was determined according to the following formula (Tab. 5a):

STY=g(chlorine)·g$^{-1}$(catalyst)·h$^{-1}$(time).

After this regeneration, the catalyst pellets were removed and ground in a mortar and the ruthenium content and sulfur content were determined by means of RFA (Tab. 5b). The procedure was also effected by the same method with a corresponding proportion of the unregenerated catalyst pellets.

TABLE 5a

STY of the catalysts (before and) after the regeneration.

| Interval | | | | | |
|---|---|---|---|---|---|
| | | Sample | STY of 2b [g/gh] | | STY of 1a [g/gh] |
| T [° C.] | Duration [h] | weight [g] | before | after | after |
| 330 | 63 | 1 | 0.35 | 0.49 | 0.595 |
| 380 | 14 | 1 | 0.35 | 0.565 | 0.625 |
| 380 | 63 | 0.42 | 0.41 | 0.84 | 0.85 |

TABLE 5b

Sulfur content and ruthenium content of the catalysts (before and) after the regeneration (determined by means of RFA).

| Interval | | | 2b: Sulfur [%] | | 2b: Ruthenium [%] | |
|---|---|---|---|---|---|---|
| | | Sample | | | | |
| T [° C.] | Duration [h] | weight [g] | after | before | after | before |
| 330 | 63 | 1 | n.d. | n.d. | n.d. | n.d. |
| 380 | 14 | 1 | 0.21 | 0.62 | 2.7 | 2.7 |
| 380 | 63 | 0.42 | 0.17 | 0.62 | 2.4 | 2.7 |

At 380° C., the STY gain of the catalyst (2b) poisoned with sulfur after a regeneration duration of 16 h is significantly higher than at 330° C. after a regeneration duration of 63 h. Evidently, the increase in the regeneration temperature from 330° C. to 380° C. has a considerable positive effect on the success and the required duration of the regeneration. Intermittent regeneration is evidently not necessary since, even after only one regeneration interval, the STY virtually (16 h at 380° C.) or completely (63 h at 380° C.) reaches the level of the unpoisoned reference catalyst (1a). However, a very long regeneration duration, e.g. 63 h at 380° C., also leads to a significant ruthenium loss of the catalyst.

Comparative Example 6

Trend in the activity of a supported ruthenium catalyst ($SnO_2$ support) poisoned with sulfur in the form of the sulfur compound $SO_2$ without regeneration In each case 1 g of the catalyst pellets having the designations 1a and 2a were initially introduced into two quartz reaction tubes (diameter 10 mm) and gas mixture 1 (10 l/h) composed of 1 l/h of hydrogen chloride, 4 l/h of oxygen and 5 l/h of nitrogen flowed through said catalyst pellets for 63 h at 330° C. After 1 h and after 62 h, the product gas stream of all reactors was passed twice for about 15 min through a 20% strength potassium iodide solution in order to check the trend in the STY. The iodine formed was then titrated with 0.1 N thiosulphate standard solution (double determination) in order to determine the amount of chlorine passed in. From the amount of chlorine determined in this manner, the space-time yield (STY) was determined according to the following formula (Tab. 6):

STY=g(chlorine)·g$^{-1}$(catalyst)·h$^{-1}$(time).

TABLE 6

STY trend of the catalysts without regeneration.

| Interval | STY of 1a [g/gh] | STY of 2a [g/gh] |
|---|---|---|
| before | 0.685 | 0.385 |
| after | 0.655 | 0.405 |

The STY of the catalyst poisoned with sulfur in the form of sulfur compounds remained constant; accordingly, under the conditions of gas mixture 1 (Deacon reaction), no regeneration is observable. Oxidative conditions are evidently unsuitable for the regeneration method according to the invention.

Example 7

Influence of the regeneration of supported ruthenium catalysts poisoned with sulfur in the form of the sulfur compound $SO_2$ on the activity thereof in the CO oxidation.

In each case 0.42 g of the catalyst pellets having the designations 1a, 2b and a catalyst regenerated according to Example 3 were initially introduced into three quartz reaction tubes (diameter 10 mm) and a gas mixture 3 (9 l/h) composed of 0.25 l/h of carbon monoxide, 0.05 l/h of carbon dioxide, 4 l/h of oxygen and 4.7 l/h of nitrogen flowed through said catalyst pellets at different temperatures (200-280° C.). After a run in time of about 2 h at each temperature level, the product gas stream of all reactors was passed in each case for half an hour through a gas sampling tube (200 ml). Thereafter, the gas sampling tube was unclipped and the composition of the content was checked by means of GC. From the $CO/CO_2$ concentrations determined, the conversion was calculated according to the following formula (Tab. 7):

$$\text{Conversion}[\%] = \{1 - CO_t[\%]/CO_0[\%]\} \cdot 100$$

where $CO_t/CO_{2t}$: actual $CO/CO_2$ concentration; $CO_0/CO_{20}$: $CO/CO_2$ concentration in the feed.

The mass balance ($CO_t + CO_{2t} = CO_0 + CO_{20}$) was fulfilled to a good approximation for all results mentioned.

TABLE 7

CO oxidation using a poisoned, a regenerated and an unpoisoned catalyst.

| Temperature [° C.] | Conversion [%] | | |
|---|---|---|---|
| | 2b | 2b after regeneration according to Example 3 | 1a |
| 200 | 43 | 65 | 70 |
| 220 | 51 | 96 | 94 |
| 250 | 75 | n.d. | 97 |
| 280 | 88 | 98 | 98 |

While the CO in the feed stream is only partly converted into $CO_2$ over the total temperature range between 200 and 280° C. over the catalyst (2b) poisoned with sulfur in the form of sulfur compounds, a virtually complete conversion is achieved both by the unpoisoned reference catalyst (1a) and by the catalyst regenerated according to Example 3 (2b after regeneration according to Example 3), at as low as 220° C. The activity behaviour of the regenerated supported ruthenium catalyst is identical to that of the unpoisoned reference catalyst within the accuracy of measurement.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A catalyst regeneration process consisting essentially of: providing a catalyst comprising a supported catalytic component selected from the group consisting of ruthenium, ruthenium compounds, and combinations thereof, wherein the supported catalytic component comprises a support material selected from the group consisting of titanium dioxide, alumina, zirconium oxide, tin dioxide and mixtures thereof, and
wherein the catalyst is sulfur-poisoned with one or more sulfur compounds; and
treating the catalyst with a gas stream consisting of at least one hydrogen halide and optionally at least one inert gas, such that the catalyst is regenerated;
wherein the catalyst regeneration process is performed in a reaction space where a reaction catalysed by the catalyst is performed, and
wherein the reaction is the catalytic oxidation of hydrogen chloride with oxygen.

2. The process according to claim 1, wherein the hydrogen halide comprises hydrogen chloride.

3. The process according to claim 1, wherein treating the catalyst with the gas stream is carried out at a temperature up to 600° C.

4. The process according to claim 1, wherein treating the catalyst with the gas stream is carried out at a temperature of 200° C. to 500° C.

5. The process according to claim 2, wherein treating the catalyst with the gas stream is carried out at a temperature of 200° C. to 500° C.

6. The process according to claim 1, wherein treating the catalyst with the gas stream is carried out at a temperature of 300° C. to 450° C.

7. The process according to claim 1, wherein treating the catalyst with the gas stream is carried out at a pressure of up to 20 bar.

8. The process according to claim 1, wherein treating the catalyst with the gas stream is carried out at a pressure of up to 5 bar.

9. The process according to claim 1, wherein treating the catalyst with the gas stream is carried out at a pressure of up to 1.5 bar.

10. The process according to claim 1, wherein hydrogen halide is present in an amount of 0.1 to 100% by volume.

11. The process according to claim 1, wherein hydrogen halide is present in an amount of 1 to 30% by volume.

12. The process according to claim 1, wherein hydrogen halide is present in an amount of 5 to 25% by volume.

13. The process according to claim 1, wherein the catalytic component comprises a ruthenium compound selected from the group consisting of ruthenium chlorides, ruthenium oxyhalides, ruthenium oxides, and mixtures thereof.

14. The process according to claim 1, wherein treating the catalyst with the gas stream is carried out over a period of 0.5 hour to 100 hours.

15. The process according to claim 1, wherein treating the catalyst with the gas stream is carried out such that the gas stream is passed over the catalyst in a direction opposite to a direction of flow of tile reaction catalyzed by the catalyst.

16. The process according to claim 1, wherein the catalyst comprises a gas-phase oxidation catalyst for hydrogen chloride with oxygen.

17. The process according to claim 1, wherein treating the catalyst with the gas stream is carried out intermittently in two or more time intervals and a catalyst property selected from the group consisting of sulfur content, activity and combinations thereof is determined between the two or more time intervals.

18. The process according to claim 1, wherein the one or more sulfur compounds is selected from the group consisting of $H_2SO_4$, $H_2SO_3$, $SO_3$, $SO_2$, COS, $H_2S$, salts of $H_2SO_4$, $H_2SO_3$, and mixtures thereof.

19. The process according to claim 1, wherein the support material is titanium dioxide or tin dioxide.

20. A process comprising: providing hydrogen chloride; oxidizing the hydrogen chloride in the gas phase with oxygen in the presence of a catalyst comprising a catalytic component selected from the group consisting of ruthenium, ruthenium compounds, and combinations thereof; and subjecting the catalyst to a regeneration process according to claim 1.

* * * * *